ounited States Patent Office 3,043,879
Patented July 10, 1962

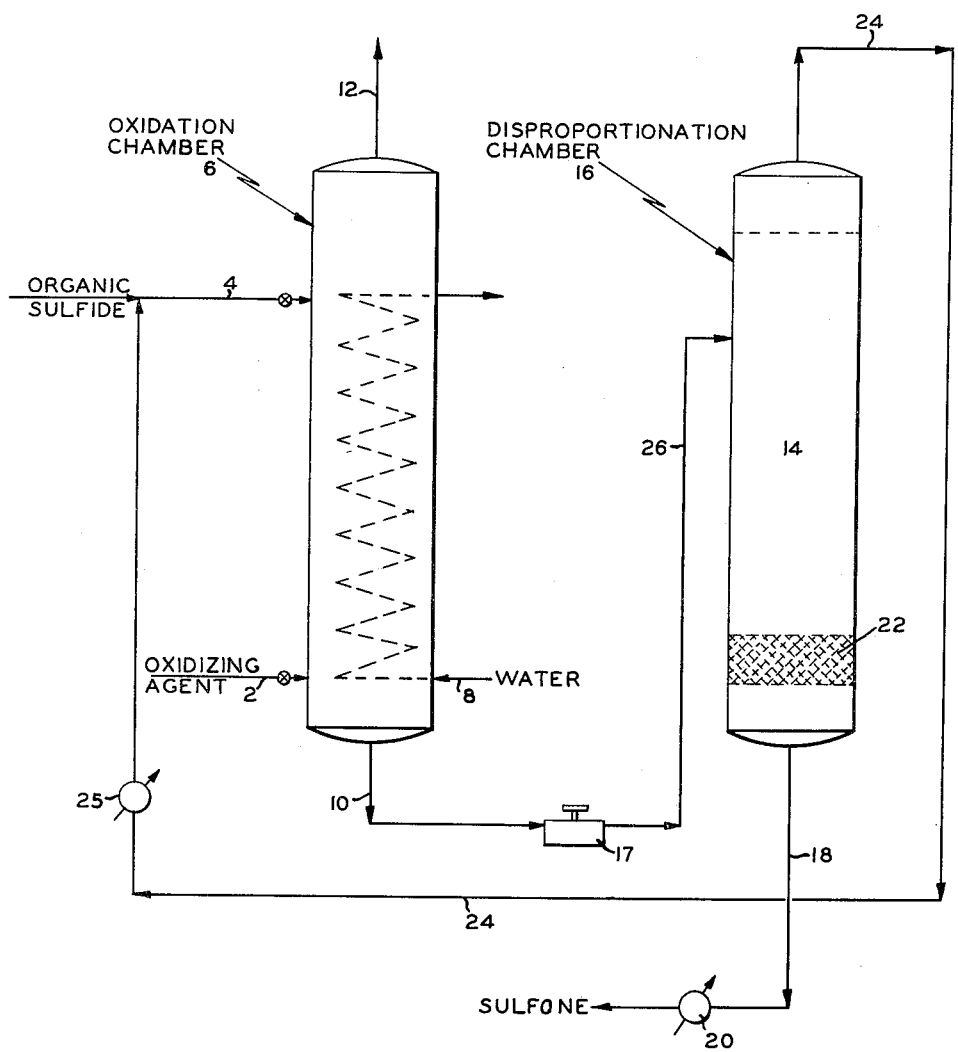

3,043,879
PROCESS FOR PREPARING SULFONES
Horace R. Davis, Jr., and David P. Sorensen, St. Paul,
Minn., assignors to The M. W. Kellogg Company,
Jersey City, N.J., a corporation of Delaware
Filed July 25, 1958, Ser. No. 751,065
6 Claims. (Cl. 260—607)

This invention relates to a process for preparing organic sulfones from organic sulfides. More particularly, this invention relates to a two-step process for preparing organic sulfones from organic sulfides.

This application is a continuation-in-part of copending applications Serial No. 627,745, filed December 12, 1956, now U.S. Patent 2,870,163; Serial No. 566,762, filed February 21, 1956, now U.S. Patent 2,870,215; and Serial No. 627,746, filed December 12, 1956, now U.S. Patent 2,870,216.

Organic sulfones are useful as extraction solvents for various chemical compounds such as polyacrylonitrile and the like and are also useful as solvents for aromatic hydrocarbons. Owing to their unusual thermal stability, the sulfones are also useful as heat transfer agents and, although uneffected by aqueous acids and aqueous alkali, with certain reagents the sulfones act as chemical intermediates in the preparation of metal complexes which are useful in electroplating, azo dyes and the like.

Certain sulfones such as sulfonal, tetronal and the like are useful medicinally as hypnotics, and aryl sulfones have been found to be useful as paper impregnators in capacitors. The sulfones are also used with aryl compounds as ingredients of dielectric fluids, and also applications including insecticides, bactericides, intestinal antiseptics, tanning agents and the like. Although the sulfones have a wide range of uses, their application has been restricted prior to the present invention to the relatively expensive and lengthy processes which have been employed for their production.

Organic sulfides have been successfully oxidized to sulfoxides using air as an oxidizing agent, but further oxidation to the sulfone has required the use of chemical reagents such as hydrogen peroxide, nitric acid, potassium permanganate, chromic acid and the like. These methods present many difficulties when operating on a commercial scale. For example, the chemical reagents are expensive and are not easily handled in a commercial apparatus; the yields obtained by these treatments are relatively small compared to the amount of reagent used, hence these processes are inefficient.

It is, therefore, an object of the present invention to provide a process for preparing a sulfone from an organic sulfide which process is commercially and economically feasible.

Another object of this invention is to provide a continuous process for preparing a sulfone from an organic sulfide, which process is commercially and economically feasible.

Another object of this invention is to provide a process for preparing a sulfone from an organic sulfide which converts substantially all of the sulfide to sulfone.

These and other objects and advantages of the present invention will become apparent to those skilled in the art from the following description and disclosure.

The present invention relates to a two-step process for preparing a sulfone which comprises reacting an organic sulfide with an oxidizing agent in an oxidizing zone to produce an organic sulfoxide and then contacting the organic sulfoxide thus produced with osmium tetroxide in a separate disproportionation zone to produce the corresponding sulfone and organic sulfide. This process can be readily made continuous by recycling the sulfide product to the oxidation zone.

The organic sulfides which may be converted in accordance with this invention are those which contain a sulfur atom which is singly bonded to each of two organic radicals, i.e., organic sulfides which contain a

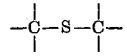

group. One type of sulfide included in this group is illustrated by the formula (R—S—R')$_n$ in which $n$ is an integer from 1 to 100 or more, and R and R' may be identical or different organic radicals such as a saturated hydrocarbon alkyl radical of the homologous series methyl, ethyl, propyl, butyl, cetyl, eicosyl, heptacontyl, and the like, and isomers thereof; a mono- or polyolefinic hydrocarbon radical derived from the homologous series of unsaturated compounds such as ethylene, propylene, butylene, and the like, and propadiene, butadiene, and the like and isomers thereof; a saturated cyclic hydrocarbon radical derived from cyclobutane, cyclopentane, cyclohexane, and the like and isomers thereof; an unsaturated cyclic hydrocarbon radical derived from cyclobutane, cyclohexane, cyclooctatetrane, cyclohexadiene, cyclopentadiene, and the like and isomers thereof; a saturated or unsaturated heterocyclic radical derived from quinone, pyrrolidiene, pyrrole, thiophene, indole, carbazole, pyridine, acridine, and the like and isomers thereof; and an aromatic radical derived from benzene, naphthalene, anthracene, and the like, including an alkyl, alkenyl and halogen substituted aromatic radical such as one derived from styrene, ethyl benzene, trichloromethylbenzene, toluene, xylene, diethylbenzene, and the like.

The aliphatic carbon atoms of the organic sulfide may also be partially or totally substituted with any of the halogens; with alkyl radicals derived from the homologous series ethane, propane, butane and the like and isomers thereof; with olefinic radicals derived from the homologous series ethylene, propylene, butylene and the like and isomers thereof; with diolefinic radicals derived from butadiene and the like and/or with functional groups such as C=O, NO$_2$, SO, COOH and COOR, wherein R is an organic radical.

Another type of sulfide which may be employed in the present invention is the organic polysulfide in which the sulfide groups are separated by at least one carbon atom. The following formula is exemplary of this type of sulfide

[R—S—(R')$_n$—S—R'']$_m$ in which $m$ and $n$ are integers from 1 to 100 or more, $n$ preferably being an integer from 1 to 10 and $m$ preferably being an integer from 1 to 20; R, R' and R'' are identical or different radicals and may be any of those listed for R and R' above. Some specific examples of these polysulfides are 2,2-Bis(ethylthio)butane, 2,2-Bis(ethylthio)propane, 3,3-Bis(ethylthio)pentane, etc.

Heterocyclic organic sulfides may also be converted to sulfones in accordance with the process of this invention. Exemplary of sulfides of this type are tetramethylene sulfide, thioxane and the like.

The preferred organic sulfides which are treated in accordance with the process of the present invention are the hydrocarbon sulfides having between 2 and 50 carbon atoms in the molecule and most preferably the aliphatic hydrocarbon sulfides wherein the aliphatic substituents on the sulfur atom are identical and each contain between 1 and 10 carbon atoms. Some specific examples of these preferred types of sulfides are dimethyl sulfide, diethyl sulfide, methyl butyl sulfide, ethyl propyl sulfide, methyl ethyl sulfide, diphenyl sulfide, methyl phenyl sulfide, methyl octyl sulfide, methylene-Bis(methyl)sulfide, 2,2-Bis- (ethylthio)butane, 2,2 - Bis(ethylthio)propane, 3,3 - Bis-(ethylthio)pentane, tetramethylene sulfide, etc. Although the higher molecular weight sulfides, and other sulfides mentioned above, for example, unsaturated sulfides, halogenated sulfides, etc., are readily converted to sulfones; uses for these sulfones are not as numerous as those for the lower molecular weight hydrocarbon sulfones included in the preferred group.

In accordance with the present invention, the foregoing organic sulfides are oxidized to the corresponding sulfoxide containing a

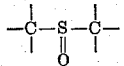

group in an oxidation zone and the sulfoxide produced is subsequently disproportionated to the corresponding sulfone containing a

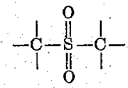

group in the presence of osmium tetroxide catalyst in a separate disproportionation zone.

The first step of the present process, namely the oxidation step, may be carried out in a gaseous or a liquid phase. In accordance with the liquid phase operation, the reaction may be carried out in an aqueous or a non-aqueous system. The non-aqueous system can be employed in the absence of a diluent when the organic sulfide is liquid under the oxidation conditions of temperature and pressure. However, a diluent may be used if desired with gaseous or solid organic sulfides to provide a liquid phase. Suitable solvents are those which do not react with the reactants or product of the present invention and which provide a liquid phase under the temperature and pressure conditions of the reaction. Some specific examples of solvents which may be used include chloroform, benzene, nitrobenzene, toluene, xylene, cyclohexane, etc.

In the oxidation step of the present process, the organic sulfide is preferably reacted with air and a catalytic amount of nitric oxide or a higher oxide of nitrogen is generally added to the mixture to initiate the reaction. This preferred oxidation step is significant in commercial operation as it provides an economical and therefore commercially feasible process. It should not be understood, however, that other oxidizing agents are unsuitable or cannot be used. On the contrary, any of the other oxygen-containing oxidizing agents may be employed with equal facility even though they increase the expense of operation. Other oxidizing agents which are suitably employed include molecular oxygen, oxygen liberating gas such as, for example, ozone, and oxides of nitrogen such as, for example, nitrogen dioxide, nitrogen trioxide and nitrogen pentoxide. It is also to be understood that any mixture of the foregoing oxidizing agents can be employed as the oxidizing agent without departing from the scope of this invention.

The oxidizing agent may be introduced to the oxidation zone by any convenient means. For example, where oxygen or air is employed as the oxidizing agent it may be introduced by bubbling the air or oxygen into the organic sulfide or by pressuring the oxygen or air into a closed vessel under superatmospheric pressure, etc. Complete oxidation of the sulfide to sulfoxide may be accomplished by employing a sufficient excess of the oxidizing agent. While the amount of oxidizing agent employed may vary between a stoichiometric amount and a 20 to 1 weight ratio of oxidizing agent to organic sulfide, it is preferred to employ a weight ratio of between about 2 to 1 and about 12 to 1.

The conditions employed for the oxidation of an organic sulfide with an oxidizing agent include a temperature of between about 25° C. to about 200° C., preferably between about 50° C. to about 150° C., and pressures ranging from subatmospheric pressure to about 1,000 p.s.i.g., however, the oxidation reaction is preferably carried out at about atmospheric pressure. Some of the organic sulfoxide is formed immediately on contacting the reactants, however, the reaction may require 24 hours to reach completion. Generally, a considerable quantity of the corresponding sulfoxide is produced after a few minutes.

The oxidation zone and the disproportionation zone represent two distinct zones which are separated from each other so as to prevent the reactants of each zone from intermixing. These zones can be located in the same reactor unit or may be in two separate reactor units. Conduit means are provided for passing organic sulfoxide produced as a product in the oxidation zone to the disproportionation zone where it becomes a reactant. This two-step method eliminates the pressure build-up normally accompanying oxidation when an oxide of nitrogen is used as an oxidizing agent in previous disproportionation reactions and is, therefore, beneficial in the continuous formation of sulfone. In the one-step process, the increasing temperature of oxidation causes a portion of the osmium tetroxide catalyst to volatilize and leave the system, thereby lowering the efficiency of the process and the amount of sulfoxide converted to sulfone per gram of catalyst. The present process represents a marked improvement over methods previously employed and is particularly advantageous when conducting the process in a continuous manner for the commercial preparation of sulfones.

The organic sulfoxide produced in the oxidation zone of the present process is passed to the disproportionation zone where it is contacted with osmium tetroxide catalyst. The catalyst can be employed in the absence or presence of a promoter. However, when the osmium tetroxide catalyst is employed alone, it is slowly reduced to its lower oxidation state in which form it losses its catalytic activity. In its reduced state it is necessary to remove the catalyst by filtration or by distillation of the volatile organic materials and recover the reduced catalyst from the distillation residue. Therefore, it is preferable to employ a promoter to prevent decomposition of the catalyst in the disproportionation zone. Thus, an oxide of nitrogen promoter is preferably used in combination with the osmium tetroxide catalyst. The effect of the oxide of nitrogen compound on the osmium tetroxide catalyst during the disproportionation reaction is altogether unexpected since it is known that osmium metal is uneffected by dilute nitric acid or by the oxides of nitrogen.

The oxide of nitrogen may be added per se or it may be derived from an oxide of nitrogen-liberating compound such as, for example, nitric acid and nitrous acid. Examples of oxides of nitrogen which are suitably used in the process of this invention are nitric oxide (NO), nitrogen dioxide ($NO_2$), nitrogen pentoxide ($N_2O_5$), nitrogen tetroxide ($N_2O_4$), and nitrogen trioxide ($N_2O_3$). The oxide of nitrogen may be added in an undiluted state or in solution, for example, in an aqueous solution. The preferred oxide of nitrogen compounds which are used in accordance with the present invention are nitrogen dioxide and nitric oxide and, since nitric acid is a convenient source of nitrogen dioxide, it is also preferred. For the purposes of the present invention, nitric acid will be included under the group referred to herein as oxide of nitrogen compounds.

The osmium tetroxide catalyst may be generated in situ by the addition of osmium metal or any compound of osmium, and an oxide of nitrogen compound to the reaction mixture, or the osmium tetroxide catalyst may be added to the disproportionation zone per se.

In the disproportionation reaction, liquid phase operation is usually preferred, however, this second step of the process may be conducted in either an aqueous or a non-aqueous system. When an aqueous system is employed, the rate and heat of reaction are more easily controlled, however, it is generally necessary to use a larger amount of osmium tetroxide catalyst in the dilute solution. It is preferred that both of the oxidation and disproportionation reactions be carried out in the liquid phase except in the case of lower boiling sulfides, such as, for example, dimethyl sulfide. The non-aqueous reaction system may be used in the presence of a diluent; if a diluent is desired to maintain a liquid phase, it must be of a type which will not react with the reactant, products or the catalyst in the disproportionation zone. For example, alcohols and aldehydes are not suitable, but exemplary of useful solvents are chloroform, benzene, nitrobenzene, toluene, xylene, acetic acid and cyclohexane.

In the disproportionation zone where organic sulfoxide is contacted with osmium tetroxide catalyst, the weight ratio of osmium tetroxide to organic sulfide in an aqueous reaction system varies between about $1 \times 10^{-7}$ to 1 and about $1 \times 10^{-4}$ to 1, preferably between about $1 \times 10^{-5}$ to 1 and about $1 \times 10^{-4}$ to 1, whereas in a non-aqueous reaction system the weight ratio varies between about $1 \times 10^{-8}$ to 1 and about $1 \times 10^{-4}$ to 1, preferably between about $1 \times 10^{-6}$ to 1 and about $1 \times 10^{-4}$ to 1. As pointed out above, it is preferred that the osmium tetroxide catalyst be used in combination with a promoter, this is particularly preferred when the amount of osmium tetroxide is present in the lower portion of the above ranges. The oxide of nitrogen compound used as a promoter may be conveniently added in the form of nitric acid and the weight ratio of a 6 normal nitric acid solution to organic sulfide is in the range of from about 1 to 1,000 to 10 to 1. The weight ratio of organic sulfide to the oxide of nitrogen compound is most preferably between about 1 to 0.5 and about 1 to 0.01.

The reactions may be effected at subatmospheric pressure, at atmospheric pressure or at superatmospheric pressure up to 1,000 p.s.i.g., superatmospheric pressure being employed when it is desired to retain the lower boiling products or diluents, such as water, within the disproportionation zone at high temperatures, or when it is desired to pressure the oxide of nitrogen compound into the reaction mixture. Generally, the pressure employed may vary from a few mm. Hg to 1,000 p.s.i.g., however, the pressure preferably employed vary from about 500 mm. Hg to about 500 p.s.i.g.

In an aqueous system the amount of water employed in both steps of the process is limited only by practical consideration of operation and isolation of the product, and in an aqueous system the disproportionation reaction is generally effected at a temperature in the range of about 65° C. to about 180° C., preferably between about 80° C. and about 150° C. The reaction rate is low at temperatures below 70° C. and, therefore, the most desirable reaction temperature is about 100° C. with the upper limit of temperature being determined only by the thermal stability of the reactants and the products of the reaction.

In the non-aqueous reaction system the temperature may be in the range of between about 18° C. and about 200° C., preferably between about 50° C. and about 120° C.

The process of the present invention is preferably carried out in a continuous manner by oxidizing the organic sulfide to an organic sulfoxide in the oxidation zone, disproportionating the organic sulfoxide to a sulfone and an organic sulfide by-product in the disproportionation zone, removing the sulfone as the product of the process and removing and recycling the organic sulfide by-product to the oxidation zone. At atmospheric pressure, when the disproportionation of dimethyl sulfoxide is carried out at a temperature below 135° C., a portion of the osmium tetroxide catalyst is removed with the sulfone product unless suitable filtering means such as, for example a molecular sieve, is provided at the sulfone product exit in the disproportionation zone. If, however, such suitable filtering means is omitted, the osmium tetroxide catalyst can be subsequently separated from the sulfone product with which it is removed by fractionation, solvent extraction with a suitable solvent, such as, for example ether, or by any other suitable and convenient means. At a temperature of, or above, 135° C., the osmium tetroxide catalyst is removed from the dimethyl sulfoxide disproportionation zone as a gas with the gaseous organic sulfide stream unless similar filtering means is provided at the sulfide product exit within the disproportionation zone. Should such filtering means be omitted, the osmium tetroxide catalyst can be recovered from the sulfide by-product before it is recycled to the oxidation zone by means of a cold trap, chromatography, distillation or by any other suitable and convenient means. In both instances, it is economical to return the separated osmium tetroxide catalyst to the disproportionation zone where it contacts fresh dimethyl sulfoxide.

In order to describe the present invention more clearly, reference is had to the accompanying drawing, FIGURE 1, which illustrates a preferred embodiment of the present invention and is not intended to be in any way limiting thereto.

As shown in FIGURE 1, 44 pounds of gaseous dimethyl sulfide is introduced under atmospheric pressure at about 50° C. into reactor 6 by means of valved line 4. Gaseous oxygen under 15 p.s.i.g. is introduced to reactor 6 through valved line 2 in a 4:1 ratio with gaseous dimethyl sulfide. The pressure within the oxidation reactor 6 is maintained at 760 mm. Hg by venting excess vapors overhead through vapor exit line 12 located at top of the oxidation reactor 6. Since the reaction in reactor 6 is exothermic, cooling means is provided by cooling coil 8 wherein water is circulated to maintain a reaction temperature of about 80° C. Liquid dimethyl sulfoxide formed within reactor 6 is withdrawn through line 10 and is passed to reactor 16 through line 26 by means of pump 17. In reactor 16, dimethyl sulfoxide is contacted with 0.44 pound of osmium tetroxide promoted with 11 pounds of 6 N nitric acid in catalyst zone 14 wherein the reaction conditions are maintained at 80° C. and 760 mm. Hg. Gaseous dimethyl sulfide is removed overhead from reactor 16 by means of line 24, cooled to 50° C. in cooler 25, and is recycled to reactor 6 by combining with the organic sulfide feed in valved line 4. The liquid phase, which contains dimethyl sulfone, osmium tetroxide catalyst, is passed through a molecular sieve 22 at the base of recator 16 which effects the separation of dimethyl sulfone from osmium tetroxide and retains the latter in the disproportionation catalyst zone 14. The dimethyl sulfone passes through the molecular sieve and is withdrawn from reactor 16 by means of line 18, passed through cooler 20 from which it is removed as the product of the process.

It is to be understood that many modifications and additions to the above-illustrated process of FIGURE 1 are within the scope of this invention, for example, the oxygen which contacts the organic sulfide in reactor 6 may be fed into the reactor through a plurality of ports along the walls thereof. In another modification the cooling means supplied to oxidation reactor 6 may be provided by a cooling jacket or a bath or a refrigerant may be used in place of water through cooling coil 8. When operating at high temperature, namely at 135° C. or above, the molecular sieve in reactor 16 may be replaced by fractionation apparatus to remove osmium tetroxide from the lower boiling dimethyl sulfide. Many other modifications and process procedures will be obvious to those skilled in the art from the accompanying description and disclosure.

The following examples are offered as a better understanding of the present invention and are not to be construed as unnecesarily limiting thereto.

*Example 1*

Methyl phenyl sulfide (20 grams), is introduced into an oxidation zone at a temperature of about 135° C. Air with a catalytic amount of nitrogen dioxide is bubbled through the methyl phenyl sulfide for a period of about 3 hours. Methyl phenyl sulfoxide is continuously removed from the oxidation zone and passed to a disproportionation zone wherein it is contacted with osmium tetroxide in a weight ratio of about 1000:1. The disproportionation zone also contains a small amount of nitric acid which acts as a promoter for the osmium tetroxide catalyst. Methyl phenyl sulfone is separated from the osmium oxide by distillation and is removed as a product of the process in about 45 percent yield. Methyl phenyl sulfide in about 45 percent yield is also removed from the disproportionation zone and recycled to the oxidation zone as part of the feed thereto.

*Example 2*

Diphenyl sulfide is substituted for methyl phenyl sulfide and reacted under the conditions set forth in Example 1 to produce about a 50 percent yield of diphenyl sulfone.

*Example 3*

Diethyl sulfide is substituted for methyl phenyl sulfide and reacted under the conditions set forth in Example 1, except that the reaction temperature is allowed to vary between 120° C. and 125° C.

It is to be understood, without departing from the scope of this invention that any of the other previously described organic sulfides, particularly 3,3-Bis(ethylthio)-pentane, methyl ethyl sulfide, thioxane, methyl octyl sulfide, dioctyl sulfide, methyl butyl sulfide, ethyl propyl sulfide and 2,2-Bis(ethylthio)propane can be substituted in any of the foregoing examples and reacted to produce the corresponding sulfone.

Having thus described our invention, we claim:

1. In a process for preparing an organic sulfone from an organic sulfide wherein an organic sulfide, selected from the group consisting of $(R-S-R')_n$ and $(R-S-(R')_n-S-R'')_m$

wherein R, R' and R'' are selected from the group consisting of alkyl, alkenyl, monocycloalkyl, monocycloalkenyl, hydrocarbon aryl, oxygen heterocyclic and nitrogen heterocyclic radicals and $m$ and $n$ are integers from 1 to 100, is reacted with an oxidizing agent effective to produce the corresponding organic sulfoxide and the organic sulfoxide is disproportionated to the corresponding sulfone with osmium tetroxide as the disproportionation agent, the improvement which comprises: carrying out the oxidation in a zone separate from the zone where disproportionation occurs in a two-stage continuous manner so that the reaction mixture in the oxidation zone is prevented from contacting reactants in the disproportionation zone.

2. The process of claim 1 wherein oxygen with an oxide of nitrogen catalyst is an oxidizing agent.

3. The process of claim 1 wherein the organic sulfide is dimethyl sulfide, the organic sulfoxide is dimethyl sulfoxide and the organic sulfone is dimethyl sulfone.

4. The process of claim 1 wherein the weight ratio of osmium tetroxide to organic sulfoxide is between about $1 \times 10^{-8}:1$ and about $1 \times 10^{-2}:1$.

5. In a process for preparing an organic sulfone from an organic sulfide wherein an organic sulfide, selected from the group consisting of $(R-S-R')_n$ and $(R-S-(R')_n-S-R'')_m$

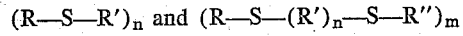

wherein R, R' and R'' are selected from the group consisting of alkyl, alkenyl, monocycloalkyl, monocycloalkenyl, hydrocarbon aryl, oxygen heterocyclic and nitrogen heterocyclic radicals and $m$ and $n$ are integers from 1 to 100, is reacted with an oxidizing agent effective to produce the corresponding organic sulfoxide and the organic sulfoxide is disproportionated to the corresponding sulfone with osmium tetroxide as the disproportionation agent, the improvement which comprises: carrying out the oxidation in a zone separate from the zone where disproportionation occurs in a two-stage continuous manner so that the reaction mixture in the oxidation zone is prevented from contacting reactants in the disproportionation zone and recovering osmium tetroxide from the organic sulfone product by solvent extraction of the osmium tetroxide.

6. In a process for preparing an organic sulfone from an organic sulfide wherein an organic sulfide, selected from the group consisting of $(R-S-R')_n$ and $(R-S-(R')_n-S-R'')_m$

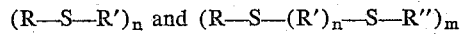

wherein R, R' and R'' are selected from the group consisting of alkyl, alkenyl, monocycloalkyl, monocycloalkenyl, hydrocarbon aryl, oxygen heterocyclic and nitrogen heterocyclic radicals and $m$ and $n$ are integers from 1 to 100, is reacted with an oxidizing agent effective to produce the corresponding organic sulfoxide and the organic sulfoxide is disproportionated to the corresponding sulfone with osmium tetroxide as the disproportionation agent, the improvement which comprises: carrying out the oxidation in a zone separate from the zone where disproportionation occurs in a two-stage continuous manner so that the reaction mixture in the oxidation zone is prevented from contacting reactants in the disproportionation zone; removing osmium tetroxide from the sulfone product, recycling any organic sulfide formed in the disproportionation zone to the oxidation zone and recovering the organic sulfone from the disproportionation zone as a product of the process.

References Cited in the file of this patent

UNITED STATES PATENTS 2,870,216     Sorenson et al.           Jan. 20, 1959
2,893,911     Raasch                  July 7, 1959

OTHER REFERENCES

Bader: J. Am. Chem. Soc. 70, 3938–3939 (1948).